Patented Feb. 25, 1930

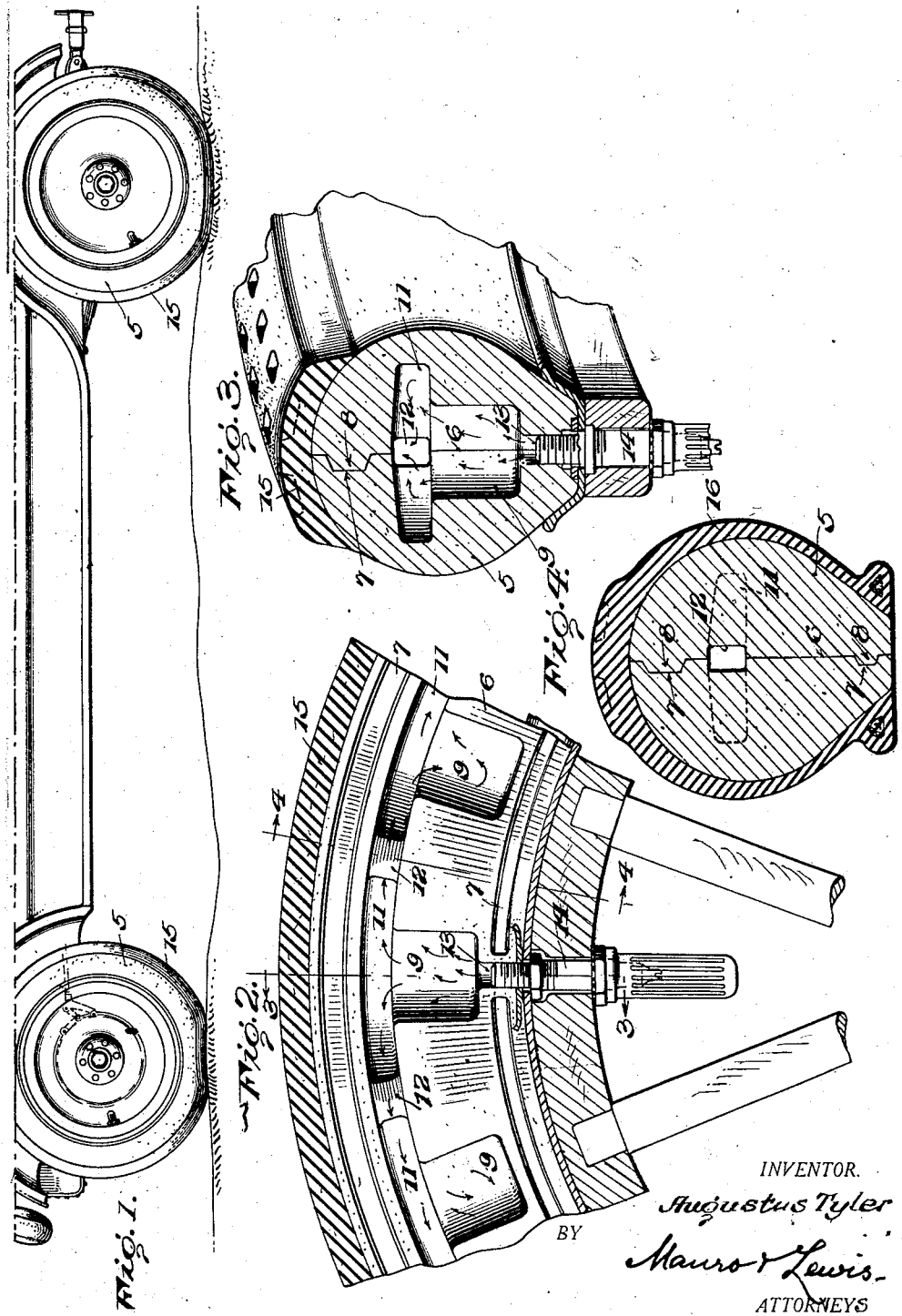

1,748,318

UNITED STATES PATENT OFFICE

AUGUSTUS TYLER, OF FLINT, MICHIGAN

RESILIENT TIRE

Application filed July 20, 1927, Serial No. 207,270. Renewed May 23, 1929.

This invention relates to the construction of resilient tires for automobiles and other vehicles. One of its objects is to obtain and embody in one structure the principal advantages of the pneumatic and those of the solid tire, while avoiding the disadvantages of both. More specifically, the object is to obtain the resiliency of the pneumatic tire, with its capacity for distortion to accommodate itself to irregularities in or upon the surface of the road, and to obtain at the same time the great durability, practical immunity from puncture, and resistance to the transmission of shocks, which characterize the solid tire.

A further object of the invention is to provide a tire having the characteristics specified above, and which is adapted to be enclosed within an outer casing, such as now used in the double tube type of pneumatic tires. By thus using a tire of the construction herein described as a filler or core, in place of the ordinary inner tube, a casing or outer tube which has become worn to such an extent as to be no longer fit for use with the ordinary inner tube, may be still utilized for much additional mileage. I thus obtain the advantage of economy, in addition to the other advantages indicated above.

Further objects of my invention are: to provide a tire having greater durability and mileage capacity than the ordinary makes of pneumatic tires now in use; having also the capacity of absorbing to an unusual degree the shocks caused by impact with obstacles on the road, and of resisting the transmission of such shocks to the vehicle; and which, by reason of special features of construction hereinafter described, conduces to the smooth and comfortable riding qualities of the vehicle.

The features of construction which constitute the present invention and the objects thereof will be more fully understood from the following detailed description, wherein reference is made to the accompanying drawings, in which—

Figure 1 is a side elevational view of the lower portion of a vehicle, illustrating the manner in which the tires adjust themselves to road irregularities;

Figure 2 is a partial section of the tire in a plane at right angles to the axis of the wheel;

Figure 3 is a fragmentary perspective view of the tire with one end shown in section, taken substantially along a line 3—3 of Figure 2; and Figure 4 is a transverse sectional view along a line 4—4 of Figure 2.

In the several figures of the drawings my invention is illustrated as embodied in a tire which is of conventional shape, but is molded out of resilient rubber in separate sections, as indicated at 5, each section being a complete ring or circle, and the plane of division 6 between the sections being central of the tire and at right angles to the axis of the wheel. The sections 5 are or may be of identical construction, except that, where one section has circumferential grooves or depressions 7, 7, in the face thereof, the other has correspondingly shaped ribs 8, 8, to fit into the opposite grooves when the two sections are put together, as shown for example in Figures 3 and 4. The making of the tire in two sections as shown, facilitates the formation of the air-chambers or cavities within the tire which constitute an important feature of my invention. As shown in the drawings these air chambers, which are disposed in spaced relation around the entire circumference of the tire, are composed each of two distinct parts, part 9 being cup-shaped and relatively of considerable height, and part 11, which also is of cylindrical form, being considerably greater in diameter than part 9; and the two parts 9 and 11 of each chamber being concentric. The axis of each of these two-part air chambers is in the line of a radius of the wheel, the wide part 11 of each chamber being towards the tread-face of the tire.

In tires of ordinary construction the flattening of the tire due to partial deflation causes a spreading on each side which in some cases results in rim cuts. Also in the case of double tube tires, when in a state of partial deflation, there is likely to be a working and friction of the surface of the inner tube upon the adjacent surface of the outer, which may result in blow outs. I have found by practical tests that these disadvantages are avoided to a large extent by constructing the tire as just described. The wide part of the air cavities being nearest to the tread, the tire gives readily in a vertical direction (from the part in contact with the ground upward) there being therefore no appreciable dilation laterally at that part of the tire; and on the other hand, the walls of the tire are thickened alongside the part 9 of each air-chamber, because of the relatively small diameter of this part of the air-chamber.

Chambers 11 communicate with each other by means of restricted air passages 12, that pass through the intervening webs of rubber that separate one chamber from the next adjacent to it. By means of passages 12 which are of relatively small cross-sectional area, all the chambers 9 and 11 are connected together into one communicating system, so that the air pressure within the tire is normally uniform throughout. But in the case of extra compression occurring locally, as when an obstacle or irregularity upon the road is encountered, the effect is not instantly transmitted all around the circumference, as in the case of a pneumatic tire, but, because of the small cross-sectional area of the communicating passages 12, the transmission of the shock is retarded, with the result that the shock itself is locally absorbed, and is not communicated to the body of the vehicle.

The construction and arrangement of the connected series of air-chambers is such that areas which yield readily, when an obstruction or road irregularity is encountered, alternate with relatively unyielding areas all around the tire. This construction tends to localize the effects of shocks when obstructions are encountered.

Preferably a valved air-inlet is provided, in communication with one of the chambers 9, as shown in Figs. 2 and 3, where an inlet opening 13 is fitted with a valve-stem 14, such as commonly used in connection with pneumatic tires. By means of this arrangement the desired air-pressure may be maintained throughout the entire air-chamber system. To obtain good results the pressure need be only a few pounds above atmospheric pressure.

The tire sections 5 may have a tread 15 molded or vulcanized thereon, as shown in Fig. 3; the tread serving also as a means for securing said tire sections firmly together at their outer edges. But the meeting faces of the sections may be fastened together by vulcanization, or by cement, or in any suitable way, so as to make the system of chambers or cavities within the tire air-tight.

The tire may be used to advantage by enclosing it in an outer sheath 16 (Fig. 4), such as the outer tube or casing of an ordinary pneumatic tire, and may by means thereof, be mounted upon the rim of the wheel. By thus constructing the tire so that it may be used as a core or filler within a casing or sheath, in place of the inner tube of a pneumatic tire, casings that, by reason of wear or injury, are no longer usable with an ordinary inner tube may yet be capable of considerable usage in connection with tires constructed according to my invention as explained above.

What is claimed is:

1. A tire composed of resilient material having within its body a series of two-part air-chambers in spaced relation around the tire, both parts of each chamber being cylindrical in shape, that part of each which is nearest the tread being of larger diameter and of less height than the other part.

2. A tire composed of resilient material having within its body a series of two-part air chambers in spaced relation around the tire and all connected into a communicating series by air passages of restricted diameter, both parts of each chamber being cylindrical in shape, that part which is nearest the tread being of larger diameter and of less height than the other part.

3. A tire composed of resilient material having within the body thereof a series of air chambers disposed in spaced relation around the tire, each chamber being formed of two concentric cylindrical portions, that portion nearest the tread being of substantially greater diameter and of less height than the other portion, the axis of each chamber being in the line of a radius of the wheel.

In testimony whereof I have signed this specification.

AUGUSTUS TYLER.